July 5, 1949. F. S. KEAHEY 2,475,393
COUPLING BEARING
Filed Feb. 19, 1944 2 Sheets-Sheet 1
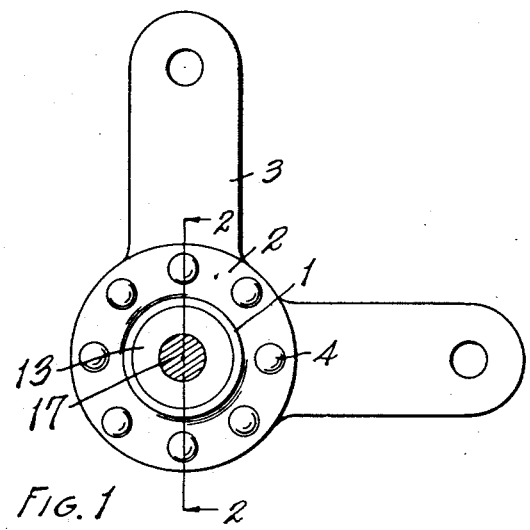
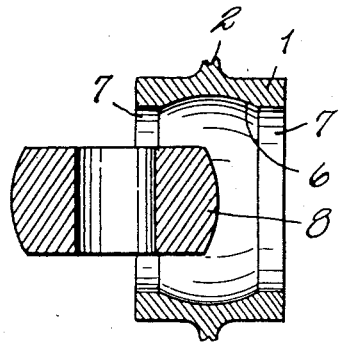
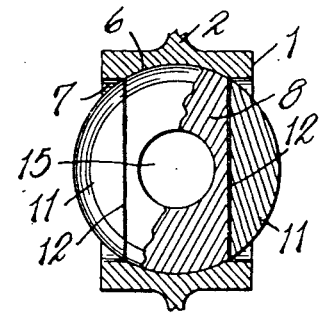
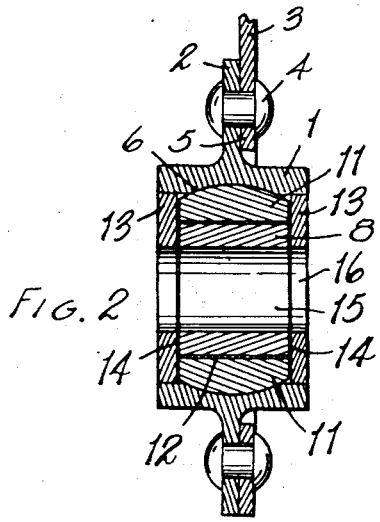
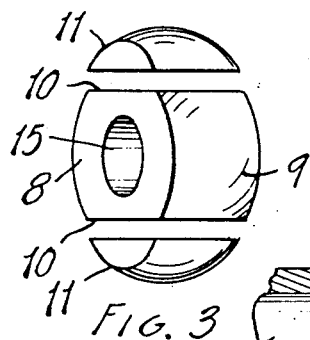
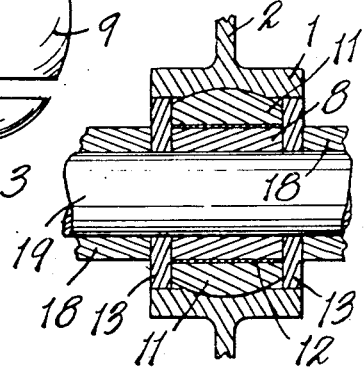
INVENTOR.
FRANK S. KEAHEY
BY
Earl D. Chappell July 5, 1949.　　　　F. S. KEAHEY　　　　2,475,393
COUPLING BEARING Filed Feb. 19, 1944　　　　　　　　　　　2 Sheets-Sheet 2

INVENTOR.
FRANK S. KEAHEY
BY
Earl T. Chappell

Patented July 5, 1949

2,475,393

UNITED STATES PATENT OFFICE 2,475,393

COUPLING BEARING

Frank S. Keahey, Sturgis, Mich., assignor, by direct and mesne assignments, to Kirsch Company, Sturgis, Mich.

Application February 19, 1944, Serial No. 523,083

3 Claims. (Cl. 308—72)

This invention relates to improvements in coupling bearings.

The main objects of this invention are:

First, to provide a bearing or coupling which is well adapted for remote controls in which the object controlled is so located as to necessitate a change in the direction of the pull or thrust.

Second, to provide a bearing or coupling which is simple and compact in structure and at the same time capable of sustaining heavy loads.

Third, to provide a structure having these advantages which may be assembled as a complete unit for installation in various relations or for use in repair.

Fourth, to provide a bearing or coupling structure having a wide range of adaptation and uses.

Further objects pertaining to details and economies of the invention will definitely appear from the description to follow. The invention is defined in the claims.

A structure embodying the features of the invention is clearly illustrated in the accompanying drawing, in which:

Fig. 1 is a side elevation of a bell crank lever bearing or coupling structure embodying the invention, the supporting pin or spindle being shown in section.

Fig. 2 is an enlarged fragmentary section on a line corresponding to line 2—2 of Fig. 1, the pin or supporting spindle being omitted.

Fig. 3 is an exploded view of the inner bearing member shown in the embodiment of my invention of Figs. 1 to 5, inclusive.

Fig. 4 is a fragmentary section illustrating certain steps in the method of assembling the parts.

Fig. 5 is a fragmentary view partially in section illustrating further steps of assembly and further structural features.

Fig. 6 is a fragmentary view partially in section of a slightly modified form or adaptation of my invention.

Figure 7:
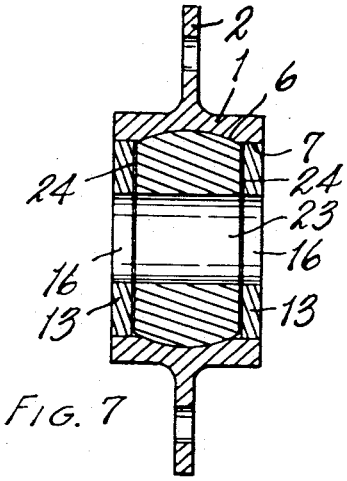
Fig. 7 is a fragmentary section corresponding to that of Fig. 2 of still another embodiment or adaptation of the invention.

The embodiment of the invention illustrated in Figs. 1 to 5, inclusive, is an adaptation to a bell crank lever primarily designed for remote controls, although having a wide range of utility. The outer bearing member 1 is provided with an annular flange 2 to which the bell crank member 3 is secured as by means of the rivets 4, the arms of the bell crank member extending from an annular part 5 disposed at the sides of the flange 2 and riveted thereto. The outer bearing member is provided with an annular internal spherically concaved intermediate bearing portion 6 and a cylindrical bearing portion 7 at each end thereof. It will be noted that the bearing portion 6 is continuous.

The inner bearing member in this embodiment comprises a main ball member 8 having spherically convexed segmental bearing portions 9 adapted to coact with the internal bearing 6. This member 8 has flat sides 10 intermediate the segmental bearing portions 9 and the auxiliary bearing members 11 are superimposed upon these flat sides and secured thereto, preferably by soldering or brazing as indicated at 12. In this respect the inner and outer bearing members are such as shown in my application for Letters Patent Serial No. 516,797, now Patent No. 2,384,095, filed January 3, 1944. The inner bearing member is formed of these parts to permit assembling within the outer bearing member, the element 8 being introduced by presenting edgewise to the outer bearing member as shown in Fig. 4. It is then swung to the position shown in Fig. 5, the bearing members 11 with their spherically convex bearing surfaces complementary to the surfaces 9 are secured, and the assembled parts can then be rotated into bearing relation as shown in Figs. 2 and 6. The annular end members 13 are then inserted into the cylindrical bearing portions 7 of the outer bearing member, and in the embodiment shown in Fig. 2 are brazed or soldered to the ends of the members 8 and 11 as indicated at 14.

The central bores or openings 15 and 16 in the members 8 and 13 are adapted to receive a supporting pin or spindle 17.

With the parts thus arranged the inner and outer bearing members are effectively supported for free rotative movement relative to each other but the members 13 act to prevent axial rocking or tilting of the bearing members relative to each other or relative to the coupling pin or supporting spindle. There are many relations, particularly in remote controls, where this is a highly desirable feature.

In the embodiment of my invention shown in

Fig. 6 the members 13 are not fixedly secured to the inner bearing members but are supported in position by the collars 18 arranged on the spindle or pin 19 at each end of the bearing. This provides a satisfactorily operating structure but has the disadvantage of the parts 13 being loose and requiring some care in assembly.

In the embodiment of the invention shown in Figs. 7 to 11, inclusive, the inner bearing member 20 differs from that previously described in that it is a one-piece element. The socket or outer bearing member 1 is the same as described for the embodiment shown in Figs. 1 to 6. The member 20 has opposed spherically convex bearing surfaces 21 which coact with the internal spherically concaved bearing surface 6 of the member 1. Intermediate these bearing surfaces 21 the bearing member 20 has cylindrically curved surfaces 22, the curvature of which is transverse to the axis of the bearing member which has an opening 23 adapted to receive a coupling pin, spindle or the like. By reference particularly to Fig. 10 it will be noted that the diameter of the portion having the cylindrical curved surfaces 22 of the ball member 20 is substantially equal to the diameter of the side opening of the internal annular bearing socket 6 of socket member 1, through which opening the ball member is inserted edgewise into the internal annular bearing socket 6. This permits the area of the spherically curved bearing surfaces 21 of the ball member 20 being substantially increased as will be apparent by reference particularly to Fig. 9, thereby providing a very simple construction in which the parts may be readily assembled and in which the strength and life of the parts are substantially increased. By reference to Fig. 11 it will be noted that the curvature of the opposed portion 22 intersects the curvature of the bearing portions 21.

Figure 10:
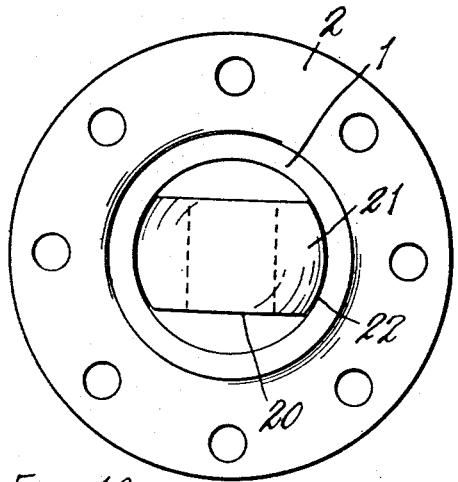
Fig. 10 is a side elevation illustrating the manner of assembling the inner and outer bearing members.

The diameter through the cylindrically curved portions 22 is such that the member 20 can be inserted into the outer bearing member when presented thereto edgewise as illustrated in Fig. 10. The member may then be rotated into bearing position as shown in Fig. 7. The disks 13 are then secured to the ends of the member 20 by brazing or soldering as indicated at 24, the parts coacting as in the previously described embodiments although not having the 360-degree bearing relation of the preferred embodiment. However, the structure is somewhat more economical to manufacture and is satisfactory for many purposes. The members 13 can be supported or retained as shown in Fig. 6.

Figures 11, 14:
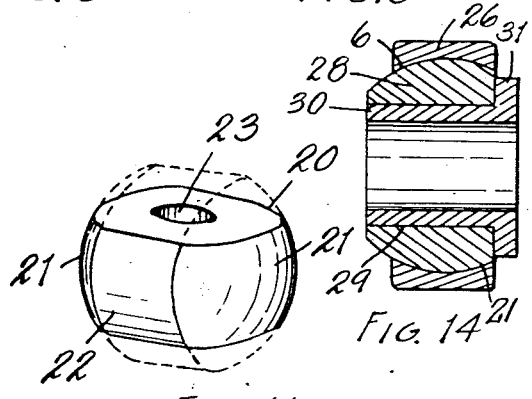
Fig. 11 is a perspective view of the inner or ball bearing member with dotted lines illustrating the intersecting relation of the bearing surfaces with cylindrically and transversely curved intermediate surfaces of the bearing element.
Fig. 14 is a longitudinal section illustrating another modification or embodiment of my invention.
Figure 12:
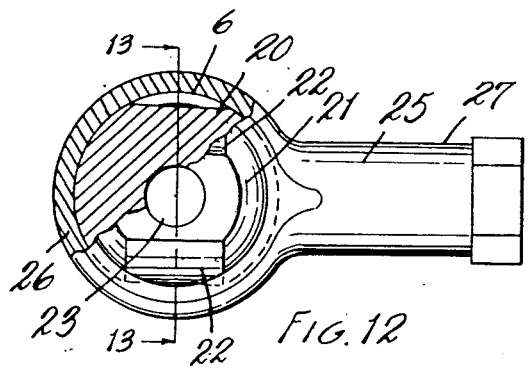
Fig. 12 is a fragmentary view partially in section on line 12—12 of Fig. 13 showing further details of the structure and the relationship of the inner and outer bearing members.
Figure 13:
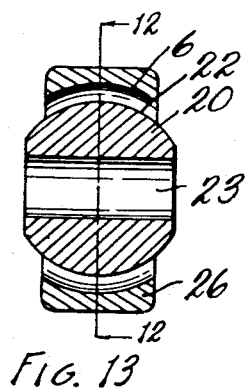
Fig. 13 is a section on line 13—13 of Fig. 12.

In Fig. 12, I illustrate an adaptation of the bearing member 20 to a rod type of coupling 25, the socket or outer bearing member 26 of this embodiment being in the form of an annular head on the end of the shank 27. Certain features of the embodiment of my invention shown in Figs. 8 to 13 inclusive constitutes the subject matter of application Ser. No. 620,460, filed October 5, 1945 as a continuation in part of the present application.

Figure 8:
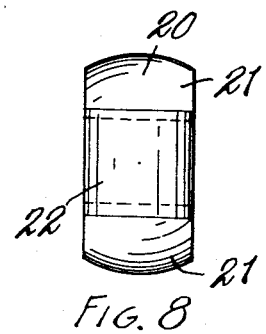
Fig. 8 is an elevation view of the inner bearing or ball member of the embodiment shown in Fig. 7.
Figure 9:
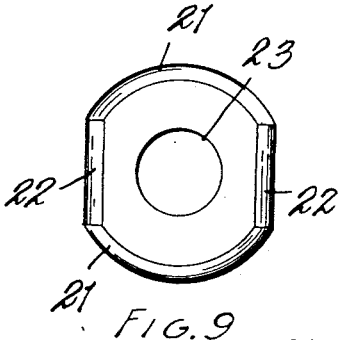
Fig. 9 is a side elevation thereof.

In the embodiment of my invention shown in Fig. 14, the inner bearing member 28 has spherically curved convex bearing surfaces 21 coacting with the internal concave bearing surface 6 of the outer bearing member and it has the cylindrical portions 22 as shown in Fig. 8.

In the embodiment shown in Figs. 8 to 13 inclusive, the inner member may shift about and perhaps become disassembled from the outer bearing member in shipment or handling prior to the assembly of the unit in position for use. To limit the canting or tilting movement of the inner bearing member 29 I provide the embodiment of the invention shown in Fig. 14, wherein the bearing 28 corresponding to the bearing 20 of Figs. 8 to 13 inclusive is provided with an enlarged bore 29 adapted to receive a bushing 30 having a flange 31 at one end. This bushing is a forced fit or otherwise secured within the bearing member 28 and its flange 31 is of such diameter as to engage a bearing extending continuously in a complete circle along one edge of the curved bearing surface 6 of the outer bearing member 26 so as to limit the axial canting or tilting movement of the inner bearing member 28 within the outer. As shown in Fig. 14 the flange 31 is of a diameter substantially equal to the diameter of the circular side opening through which the inner bearing member 28 is inserted edgewise into the outer bearing member 26, and the flange is disposed to engage the outer bearing member on the opposite sides of said opening to facilitate reduction of tilting of the inner bearing member relative to the outer member to a minimum. As shown in Fig. 12 the circular side wall opening of the outer bearing member 26 through which the inner bearing member 28 is inserted into the outer bearing member is not cut away for inserting the inner bearing member into the outer bearing member. This provides an uninterrupted circular side wall opening facilitating uninterrupted engagement of the outer bearing member 26 with the flange 31. By the expression uninterrupted engagement of the outer bearing member with the flange as above used and as used in the claims is meant an engagement which is smooth and continuous as the outer bearing member and flange are rotated relative to each other and not such as when such engagement is interrupted by one edge of the flange 31 dropping or tilting sidewise into a recess cut into the edge of the side opening of the outer bearing member to permit the inner bearing member to be inserted edgewise into the outer bearing member. Thus the inner and outer bearing members are effectively retained in their assembled relation.

It is believed that these disclosures will enable those skilled in the art to embody or adapt the invention as may be desired, and therefore I have not attempted to illustrate or describe other adaptations. As stated, the invention may be readily embodied in structures adapted for a wide range of conditions to be met, such for example as remote controls on airplanes and the like.

Having thus described my invention what I claim as new and desire to secure by Letters Patent is:

1. In a bearing, the combination of an outer bearing member having an internal annular spherically curved concave bearing surface, and an inner bearing member having an axial bore and having segmental opposed spherically curved convex bearing surfaces coacting with the internal bearing surface of said outer member and having cylindrically curved non-bearing surfaces intermediate said bearing surfaces, said cylindrically curved non-bearing surfaces intersecting said spherically curved convex bearing surfaces, said outer bearing member having an uninterrupted circular side opening for insertion of the inner bearing member edgewise into the outer bearing member, the diameter of said opening being substantially equal to the diameter of the cylindrically curved bearing portion of the inner bearing member, and a bushing disposed within said bore in said inner bearing member and having a flange at one end thereof constituting a stop limiting the axial tilting or canting movement of the inner bearing member within the outer while permitting free rotative movement of the inner and outer bearing members relative to each other, said flange being of a diameter substantially equal to the diameter of said uninterrupted circular side opening and being disposed in substantially contacting relation with said outer bearing member on opposite sides of said uninterrupted side wall opening thereof to facilitate reduction of tilting of the inner bearing member relative to the outer bearing member to a minimum, said uninterrupted circular side wall opening of the outer bearing member facilitating uninterrupted engagement of the outer bearing member with said flange.

2. In a bearing, the combination of an outer bearing member having an internal annular concaved spherically curved bearing surface, and an inner bearing member having opposed convex spherically curved segmental bearing surfaces adapted to coact with the internal bearing surface of said outer bearing member and having opposed radially reduced portions between said convex spherically curved bearing surfaces permitting the introducing of the inner bearing member within the outer when it is presented edgewise thereto, said outer bearing member having an uninterrupted circular side opening for insertion of the inner bearing member edgewise into the outer bearing member, said inner bearing member having an axial bore therein, and a bushing disposed within said bore and having a radially projecting flange of a diameter substantially equal to the diameter of said uninterrupted circular side opening and disposed in substantially contacting relation with the outer bearing member on opposite sides of said uninterrupted side wall opening to facilitate reduction of tilting of the inner bearing member relative to the outer bearing member to a minimum, said uninterrupted circular side opening facilitating uninterrupted engagement of the outer bearing member with said flange.

3. In a bearing, the combination of an outer bearing member having an internal annular spherically curved bearing surface, and an inner bearing member having opposed spherically curved segmental bearing surfaces adapted to coact with the internal bearing surface of said outer bearing member and having cut-away portions between said bearing surfaces permitting the introducing of the inner bearing member within the outer when it is presented edgewise thereto, said outer bearing member having an uninterrupted circular side opening for insertion of the inner bearing member edgewise into said outer bearing member, said inner bearing member having an axial bore therein, an annularly shaped end member carried by said inner bearing member, said annularly shaped end member being of a diameter substantially equal to said uninterrupted circular side opening and disposed in substantially contacting relation to the outer bearing member on opposite sides of said opening to facilitate reduction of tilting of the inner bearing member relative to the outer bearing member to a minimum, said uninterrupted circular side opening in the outer bearing member facilitating uninterrupted engagement of the outer bearing member with said annularly shaped end member.

FRANK S. KEAHEY.

REFERENCES CITED

The following references are of record in the file of this patent:

UNITED STATES PATENTS

| Number | Name | Date |
|---|---|---|
| 1,694,438 | Chinn | Dec. 11, 1928 |
| 1,755,723 | Bloss | Apr. 22, 1930 |
| 2,045,030 | Thompson | June 23, 1936 |
| 2,047,885 | Riebe | July 14, 1936 |
| 2,260,283 | Halford | Oct. 29, 1941 |
| 2,309,281 | Steele | Jan. 26, 1943 |

FOREIGN PATENTS

| Number | Country | Date |
|---|---|---|
| 660,407 | Germany | May 24, 1938 |